(12) United States Patent
Tyndall

(10) Patent No.: US 7,716,406 B1
(45) Date of Patent: May 11, 2010

(54) METHOD AND SYSTEM FOR PERSISTENT RESERVATION HANDLING IN A MULTI-INITIATOR ENVIRONMENT

(75) Inventor: John F. Tyndall, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 153 days.

(21) Appl. No.: 11/365,399

(22) Filed: Mar. 1, 2006

Related U.S. Application Data

(60) Provisional application No. 60/657,752, filed on Mar. 2, 2005.

(51) Int. Cl.
*G06F 12/00* (2006.01)
*G06F 13/00* (2006.01)
*G06F 15/173* (2006.01)
*H04B 7/185* (2006.01)
*H04L 12/28* (2006.01)

(52) U.S. Cl. ............... 710/200; 710/316; 709/226; 370/316; 370/401; 370/402; 370/403; 370/404; 370/405; 340/2.1; 340/2.2; 340/2.3; 340/2.4; 340/2.5

(58) Field of Classification Search .......... 710/200, 710/316; 709/226; 370/316, 401–405; 340/85, 340/2.1–2.8
See application file for complete search history.

(56) References Cited

U.S. PATENT DOCUMENTS

| | | | | |
|---|---|---|---|---|
| 5,802,316 A | * | 9/1998 | Ito et al. | 709/249 |
| 5,815,668 A | * | 9/1998 | Hashimoto | 709/238 |
| 5,999,536 A | * | 12/1999 | Kawafuji et al. | 370/401 |
| 6,009,102 A | * | 12/1999 | Horikawa et al. | 370/401 |
| 6,115,772 A | * | 9/2000 | Crater | 710/306 |
| 6,256,748 B1 | * | 7/2001 | Pinson | 714/6 |
| 6,490,635 B1 | * | 12/2002 | Holmes | 710/3 |
| 6,654,902 B1 | * | 11/2003 | Brunelle et al. | 714/4 |
| 6,658,587 B1 | * | 12/2003 | Pramanick et al. | 714/5 |
| 6,789,141 B2 | * | 9/2004 | Ayukawa et al. | 710/38 |
| 6,862,613 B1 | * | 3/2005 | Kumar et al. | 709/220 |
| 7,120,603 B2 | * | 10/2006 | Kodaka et al. | 705/50 |
| 7,257,663 B2 | * | 8/2007 | Kalos et al. | 710/316 |
| 2003/0065782 A1 | * | 4/2003 | Nishanov et al. | 709/226 |
| 2003/0137944 A1 | * | 7/2003 | Medvinsky | 370/252 |
| 2003/0188108 A1 | * | 10/2003 | Damron et al. | 711/147 |
| 2004/0153711 A1 | * | 8/2004 | Brunelle et al. | 714/4 |
| 2005/0033888 A1 | * | 2/2005 | Qi | 710/200 |
| 2005/0278465 A1 | * | 12/2005 | Qi | 710/36 |
| 2006/0123157 A1 | * | 6/2006 | Kalos et al. | 710/36 |

* cited by examiner

*Primary Examiner*—Paul R Myers
*Assistant Examiner*—Christopher A Daley
(74) *Attorney, Agent, or Firm*—Sprinkle IP Law Group

(57) ABSTRACT

Embodiments of the present invention provide a system and method for handling persistent reservations. More particularly, according to one embodiment of the present invention, a routing device that routes commands from multiple initiators to a target device can assert reservations for the initiators using its own reservation key rather than a reservation key provided by an initiator. The routing device can further maintain a registry of keys for multiple initiators that access the target device through the routing device. For a persistent reservation command received using a persistent reservation key in the registry, the routing device can forward the command to the target device server using the routing device's key. Thus, reservations for the multiple initiators will be held using the routing device's key. For persistent reservation commands received from initiators registered with the routing device, the routing device can handle conflict resolution and other persistent reservation processing.

26 Claims, 9 Drawing Sheets

METHOD AND SYSTEM FOR PERSISTENT RESERVATION HANDLING IN A MULTI-INITIATOR ENVIRONMENT

RELATED APPLICATIONS

This application claims priority under 35 U.S.C. §119(e) to U.S. Provisional Patent Application No. 60/657,752, entitled "Method and System for Persistent Reservation Handling in a Multi-Initiator Environment", filed Mar. 2, 2005, by John Tyndall, which is hereby fully incorporated by reference herein.

TECHNICAL FIELD OF THE INVENTION

Embodiments of the invention relate generally to establishing SCSI reservations at a logical unit and more particularly to systems and methods for handling persistent reservations in a multi-initiator environment.

BACKGROUND

A "persistent reservation" SCSI command is used by an initiator in a data network to reserve logical units at a target device. To utilize the persistent reservation, an initiator registers with a target device and receives a reservation key. When the initiator wishes to reserve the target for a particular purpose, the initiator sends the reservation key in a Persistent Reserve Out command. If the persistent reservation requested in the command does not conflict with another persistent reservation or reservation established using the older RESERVE command, the reservation is made at the target device. The Persistent Reserve Out command contains fields that specify the persistent reservation action, the intended scope of the reservation and the restrictions caused by the persistent reservation.

Example actions that can be taken with a Persistent Reserve Out command include Register, Reserve, Release, Clear Preempt, and Preempt and Clear. The Register action either requests a reservation key or modifies a reservation key for an initiator with the target device. A device server program within the target device maintains this key for the initiator until the initiator updates the key with a new Persistent Reserve Out command. The Reserve action creates a persistent reservation having a specified type and scope. The types of persistent reservations include Read Shared, Write Exclusive, Read Exclusive Access and Shared Access. The scope of the reservation specifies whether the reservation applies to the entire logical unit. A Persistent Reservation Out command with a Reserve action is rejected if the initiator has not registered with the target device (or device server). A Persistent Reserve Out with a Release Action removes a persistent reservation held by the same initiator. A Clear action removes all persistent reservations held by all initiators. A Preempt action removes all persistent reservations from an initiator identified in the parameter list of the Persistent Reserve Out commands, but commands already received from the specified initiator will be processed. The Preempt and Clear action, on the other hand will not only remove all persistent reservation for the specified initiator, but will also cause commands that have already been received from that initiator to be aborted.

To help coordinate reservations, initiators can issue a Persistent Reserve In command to a target device to determine if the target device has registered any initiators and has any active reservations. In response to the Persistent Reserve In command requesting reservation keys, the target device can return a list of all keys registered with the target device and, in response to a Persistent Reserve In command requesting reservations, the target device can return a list of all the active reservations (e.g., type and scope) active at the target device. The ability to see registered keys and active reservations can prevent an initiator from trying to register a conflicting key or submitting a conflicting reservation.

In recent years, data communication systems have developed in which multiple initiators in one SCSI domain may appear as a single initiator from the perspective of a target device in a second SCSI domain. In fibre channel storage area networks ("SAN"), for example, multiple fibre channel initiators may communicate with a SCSI hard disk library through a fibre channel-to-SCSI router. In this case, the hard disk library would see the fibre channel-to-SCSI router as the initiator of commands on the SCSI bus, regardless of the fibre channel initiator from which the command originated. In current systems such as this, persistent reservations are not handled, and reservations occur using the older Reserve/Release model if reservations are supported at all.

SUMMARY OF THE INVENTION

Embodiments of the present invention provide a system and method for persistent reservation handling across SCSI domains. Persistent reservation handling can be implemented, for example, at a routing device (e.g., a storage router or other routing device) for both target devices with logical units that support persistent reservations and target devices with logical units that do not support persistent reservations.

One embodiment of the present invention includes a method for handling persistent reservations that are generated by an initiator in a first domain and transmitted to a logical unit of a target device in a second domain. The method comprises receiving a persistent reservation command with a first persistent reservation key associated with a first initiator, returning an indication of a conflict to the first initiator if a reservation requested by the first persistent reservation command conflicts with a reservation held by another initiator, and forwarding the persistent reservation command to the target device if the reservation requested by the first persistent reservation command does not conflict with a reservation held by another initiator in the first domain. According to one embodiment of the present invention, the persistent reservation command can be forwarded to the target device using a second persistent reservation key associated with the routing device.

Another embodiment of the present invention includes a computer program product comprising a set of computer instructions stored on a computer readable medium. The set of computer instructions comprise instructions executable to receive a persistent reservation command with a first persistent reservation key associated with a first initiator, return an indication of a conflict to the first initiator if a reservation requested in the first persistent reservation command conflicts with a reservation held by another initiator in the first domain, and forward the persistent reservation command to the target device if the reservation requested by the first persistent reservation command does not conflict.

Another embodiment of the present includes a method for handling persistent reservations in a multi-initiator environment comprising, maintaining a registry of persistent reservation keys for a plurality of initiators, maintaining a set of reservation information associating active reservations with the persistent reservation keys in the registry, receiving a persistent reservation command associated with a first persistent reservation key from a first initiator, wherein the first persistent reservation key is in the registry, determining if a reservation requested by the persistent reservation command conflicts with a reservation requested by another initiator from the plurality of initiators and, if so, returning a reservation conflict to the first initiator.

Another embodiment of the present invention includes a method for handling persistent reservations in a multi-initiator environment comprising, receiving a first persistent reservation command with a first persistent reservation key from a first initiator using a first initiator identification, receiving a second persistent reservation command with a second persistent reservation key from a second initiator application using a second initiator identification, forwarding the first persistent reservation command and first persistent reservation key to a target device using a third initiator identification and forwarding the second persistent reservation command and second persistent reservation key to the target device using a fourth initiator identification.

Embodiments of the present invention provide an advantage over prior art systems and methods by allowing multiple initiator applications to make persistent reservations at a target device through the same routing device.

Embodiments of the present invention provide another advantage by allowing for conflict handling at a routing device between reservations requested by multiple initiators through that routing device.

Embodiments of the present invention provide yet another advantage by providing for persistent reservation handling for target devices that do not support persistent reservation handling or only support RESERVE commands.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for handling persistent reservations when the initiator is in one SCSI domain and the target device is in a different SCSI domain. More particularly, according to one embodiment of the present invention, a routing device that routes commands from multiple initiators to a target device can assert reservations for the initiators using its own reservation key rather than a reservation key provided by an initiator. The routing device can further maintain a registry of keys for multiple initiators that access the target device through the routing device. For a persistent reservation command received using a persistent reservation key in the registry, the routing device can forward the command to the target device server using the routing device's key. Thus, reservations for the multiple initiators will be held using the routing device's key. For persistent reservation commands received from initiators registered with the routing device, the routing device can handle conflict resolution and other persistent reservation processing. According to another embodiment, the routing device does not forward persistent reservation commands to the target device using its key, but instead handles all the persistent reservation command processing for the multiple initiators. In yet another embodiment, the routing device can reserve the target device using a RESERVE command and handle persistent reservation processing for the multiple initiators.

Figure 1A:
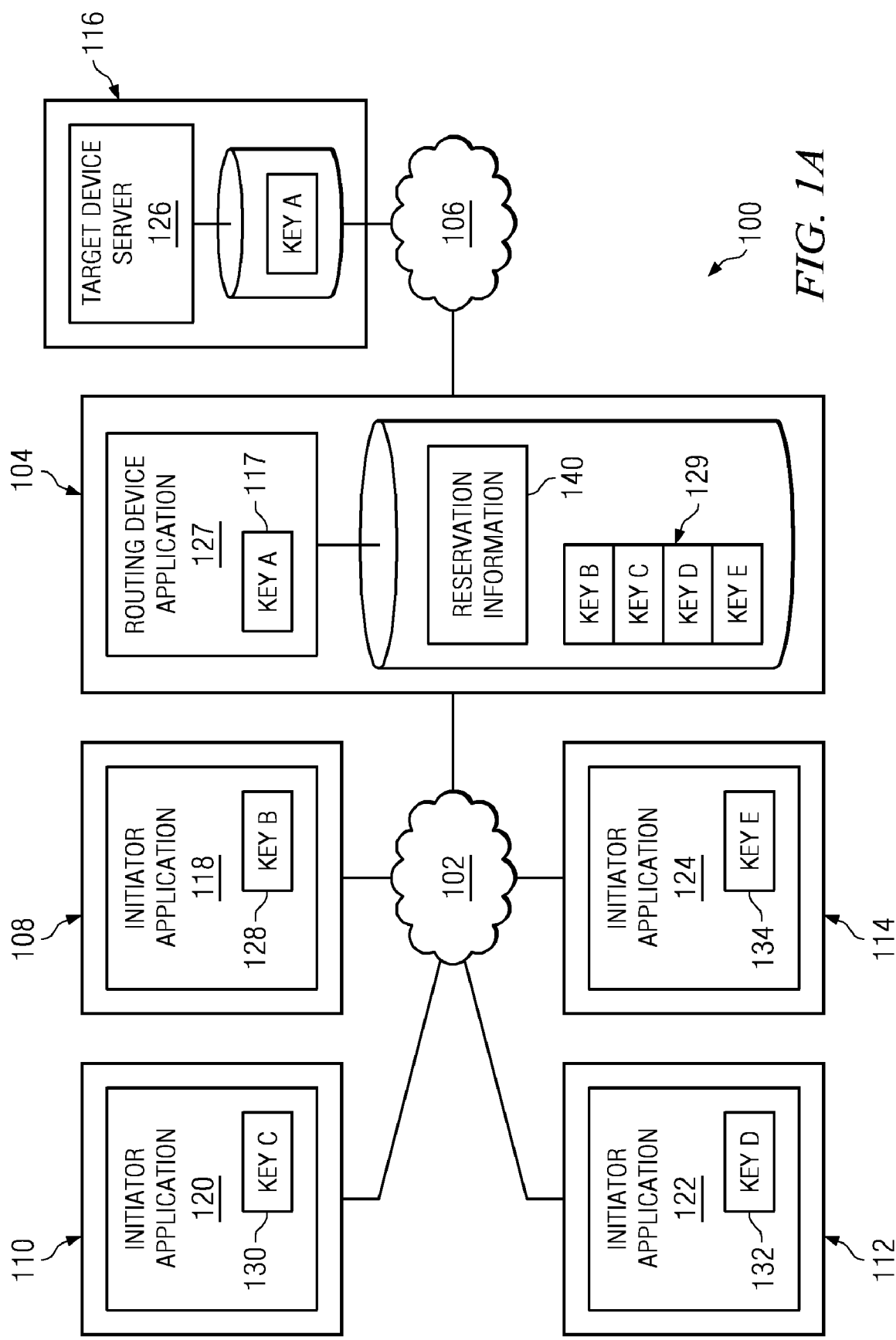
FIG. 1A is a diagrammatic representation of a data communications system according to one embodiment of the present invention.

FIG. 1A is a diagrammatic representation of a data communication system 100 in which embodiments of the present invention can be implemented. Data communication system 100 can be a storage area network ("SAN") or network attached storage ("NAS") network. Communication system 100 can include a first data transport medium 102, routing device 104, and a second data transport medium 106. Routing device 104 can be coupled to (i.e., can communicate with) initiator 108, initiator 110, initiator 112 and initiator 114 (e.g., any device that can initiate a command such as an initiator computer) via first data transport medium 102 and can send commands to and receive responses from a target 116 (e.g., any device that can receive and process a command, including persistent reservation, such as a storage device, examples of which include hard disk drives, tapes, RAID systems and other storage devices known in the art) connected by second data transport medium 106. Each initiator can run an initiator application (represented at 118, 120, 122 and 124). Additionally, target device 116 can include multiple logical unit numbers (LUNS) with each LUN having a device server. For example target device 116 can have multiple LUNS with device server 126 associated with LUN 3, and device servers (not shown) associated with the other LUNS. The initiator applications can be responsible for the processing necessary to issue commands from the initiators and each device server can be responsible for processing commands at the associated LUN. The initiators and target device can each include various computer components known in the art including memories, processors, interfaces and I/O devices.

First data transport medium 102 and second data transport medium 106 can operate according to any data transport protocol, including SCSI, Fibre Channel, advanced technology attachment ("ATA"), serial ATA ("SATA"), iSCSI, infiniband, parallel SCSI, serial attached SCSI or other data transport protocol known or developed in the art. By way of example, first data transport medium 102 can be a fibre channel transport medium and second data transport medium 106 can be a SCSI data transport medium, such as a SCSI bus. The first data transport medium 102 and second data transport medium 106 represent different SCSI domains. It should be noted that while only one target is shown, data communications system 100 can include multiple target devices.

Continuing with the example in which data transport medium 102 is a fibre channel data transport medium and data transport medium 106 is a SCSI transport medium, routing device 104 can map the initiator/initiator device to the target(s) according to any address mapping scheme known in the art, including that described in U.S. Pat. No. 6,041,381, entitled "Fibre Channel to SCSI Addressing Method and System," issued Mar. 21, 2000 to Hoese, which is hereby fully incorporated by reference herein and provide access control between initiator and target devices, such as described in U.S. Pat. No. 5,941,972, entitled "Storage Router and Method for Providing Virtual Local Storage" by Hoese, et al., issued Aug. 24, 1999, U.S. Pat. No. 6,421,753, entitled "Storage Router and Method for Providing Virtual Local Storage" by Hoese, et al., issued Jul. 16, 2002, U.S. Pat. No. 6,425,035, entitled "Storage Router and Method for Providing Virtual Local Storage" by Hoese, et al., issued Jul. 23, 2002, U.S. Pat. No. 6,730,854, entitled "Storage Router and Method for Providing Virtual Local Storage" by Hoese, et al., issued May 18, 2004, U.S. Pat. No. 6,789,752, entitled "Storage Router and Method for Providing Virtual Local Storage" by Hoese, et al., issued Jul. 19, 2004, U.S. Pat. No. 6,763,419 entitled "Storage Router and Method for Providing Virtual Local Storage" by Hoese, et al., issued Sep. 7, 2004, U.S. patent application Ser. No. 10/658,163, filed Sep. 9, 2003, entitled "Storage Router and Method for Providing Virtual Local Storage" by Hoese, et al., each of which is hereby fully incorporated by reference herein. Routing device 104 can include any network device known in the art, including storage routers, bridges, gateways or other device capable of routing data. Exemplary embodiments of routing devices include the Crossroads 6,000 and 10,000 Storage Routers by Crossroads Systems, Inc., of Austin Tex. Embodiments of the present invention can be implemented by routing device 104 through, for example, execution of a routing device application 127 that can perform persistent reservation processing according to embodiments of the present invention.

According to one embodiment of the present invention, routing device 104 can use persistent reservation key 117 ("key A") to assert reservations at the LUNS of target device 116. The key can be generated and registered according to any mechanism known in the art. Each target device server (e.g., target device server 126) can maintain a registry of reservation keys for registered initiators. From the perspective of each LUN, routing device 104 appears as an initiator and will be associated with Key A in the registry for that LUN. Routing device 104 also maintains a registry 129 of reservation keys for the initiators wishing to assert persistent reservations at target device 116. For example, routing device 104 can maintain registry 129 containing reservation key 128 ("key B") for initiator application 108, reservation key 130 ("key C") for initiator 110, reservation key 132 ("key D") for initiator 112 and reservation key 134 ("key E") for initiator application 114. Because keys are associated with an I-T nexus, multiple initiator applications using the same initiator port will share the persistent reservation key associated with that port.

Typically, reservation keys are requested by the server application of the target device to which a reservation command is directed. For reservation commands from initiators 108, 110, 112, 114, routing device 104, according to one embodiment, can generate the reservation keys in registry 129. Thus, according to one embodiment of the present invention, registry 129 can be established as if routing device 104 were the target device. Consequently, the initiators that communicate with target device 116 through routing device 104 are registered with routing device 104 rather than target device 116. Registry 129 can be maintained as a table or other data structure that stores reservation keys and related reservation state.

The initiator applications can issue Persistent Reserve commands using their respective reservation keys. For example, initiator application 128 can issue a Persistent Reserve Out command with a Reserve action containing key B. When routing device 104 receives the command, routing device 104 can determine if there is a conflict, as discussed below, and, if not, forward the Persistent Reserve Out command to target device 116 using key A. From the perspective of target device 116, it appears as though routing device 104 is issuing the Persistent Reserve Out command with the Reserve action. Routing device 104 can maintain a set of reservation information 140 for the Persistent Reserve Out command to understand the scope and type of reservation made using reservation key B.

Persistent reservation commands are associated with particular LUNS. If, for example, target device 116 contains LUNS 1-8, assume that initiator application 118 issues a Persistent Reserve Out command to LUN 3 with a Reserve action having a type of Read Exclusive using reservation key B. Routing device 104 can maintain reservation information 140 associating the Read Exclusive of LUN 3 with reservation key B. Routing device 104 can further forward the Persistent Reserve Out command to LUN 3 using reservation key A. From the perspective of LUN 3 of target device 116, routing device 104, which is registered with device server 126, is making the request.

Now assume initiator application 120 issues a Persistent Reserve Out command with a Reserve action having a type of Read Exclusive to LUN 4 of target device 116 using reservation key C. Routing device 104 can forward the command to LUN 4 using reservation key A and can add additional information to reservation information 140 associating the Read Exclusive of LUN 4 with reservation key C. Again, from the perspective of LUN 4 of target device 116, it would appear as though routing device 104 made the Read Exclusive reservation of LUN 4.

Thus, routing device 104 can receive a persistent reservation command using a first key (e.g., initiator key B) and forward the reservation command to logical unit within target device 116 using a second persistent reservation key (e.g., routing device 104's key A). In this manner, it appears as though the persistent reserve command is coming from routing device 104. Routing device 104 can maintain sufficient reservation information to determine the initiator associated with each reservation forwarded to a logical unit within target device 116 by routing device 104. Routing device 104 can further return reservation information and perform conflict handling for the initiator applications which have registered with it. The case in which there may be persistent reservations at target device 116 for other initiators not registered with routing device 104 is discussed in conjunction with FIG. 2 below.

Returning to the previous example in which routing device 104 has forwarded Read Exclusive commands for LUN 3 and LUN 4 of target device 116, assume initiator application 122 issues a Persistent Reserve In command requesting active reservations to LUN 4. Routing device 104 can return to initiator application 122 that there is a Read Exclusive Reservation for LUN 4 under reservation key C. If this information was collected directly from LUN 4 target device 116, the Read Exclusive reservation would appear under key A. Similarly, if initiator application 128 issues a Persistent Reserve In command requesting registered reservation keys, routing device 104 can return keys B-E, while the actual reservations at logical unit within target device 116 are held under key A.

With respect to conflict handling, routing device 104 can issue Reservation Conflict messages in accordance with the SPC-3 or other earlier versions of the standard. The SCSI-3 Primary Commands ("SPC-3") standard defines the conflicts that occur between new Persistent Reservation commands with existing Persistent Reservation commands and Reserve commands. Whether a conflict exists depends on the type and scope of the persistent reservation requested and the types and scopes of active persistent reservations or reserve commands.

Continuing with the previous example, if initiator application 124 issues a Persistent Reserve Out with an action of Reserve having a type of Write Exclusive to LUN 3 within target device 116, routing device 104 can return a Reservation Conflict because, according to the SPC-3 standard, any Write Exclusive for a LUN for that has already been reserved with a Read Shared, Write Exclusive, Read Exclusive, Exclusive Access or Shared Access conflicts with the previous reservation of the LUN. If, on the other hand, initiator application 124 issues a Persistent Reserve Out with an action of Reserve having a type of Write Exclusive to LUN 5, there would not be a conflict as LUN 5 of target device 116 has not yet been reserved.

It should be noted that in the above examples, routing device 104 may present a virtual view of the logical units within target device 116 to the initiator applications. In this case, when an initiator application issues a Persistent Reserve Out command to reserve LUN 3 of target device 116, this LUN can be mapped to another LUN within a virtual target created by routing device 104. Thus, routing device 104 can map the reservations of the physical logical units, conflict information or other information to the virtual view of logical unit seen by the initiator application.

Figure 1B:
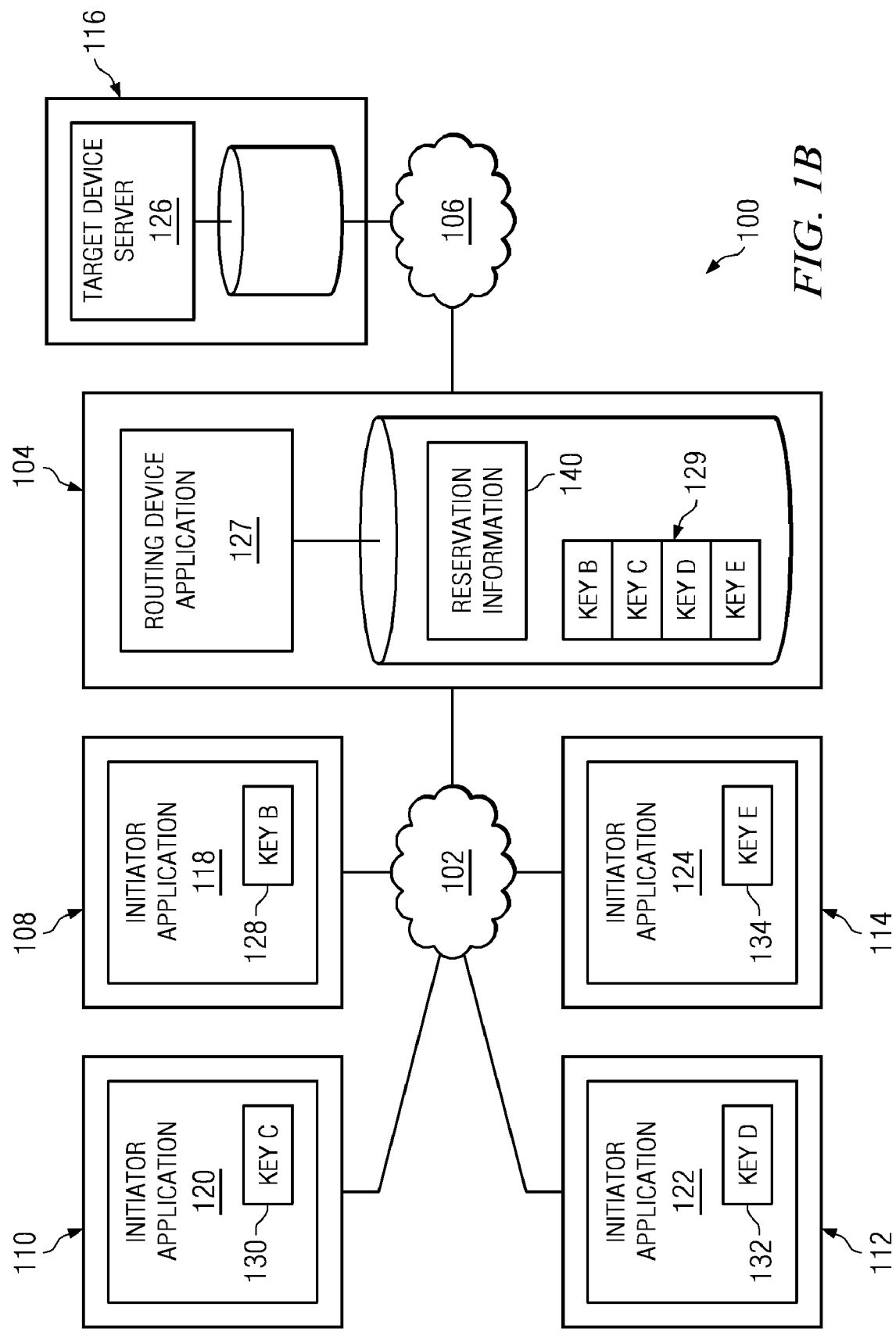
FIG. 1B is a diagrammatic representation of a data communications system according to another embodiment of the present invention.

FIG. 1B is a diagrammatic representation of a data communication system 100 in which another embodiment of persistent key reservation handling is implemented. In the embodiment of FIG. 1B, routing device 104 is the sole initiator for purposes of issuing READ/WRITE commands on data transport medium 106. This can occur, for example, if routing device 104 is a storage routing device, target device 116 is a SCSI storage device and data transport medium 106 is a SCSI bus that has no other devices attached or only has other devices attached that do not issue READ/WRITE commands to target device 116. The embodiment of FIG. 1B is similar to that of FIG. 1A except that routing device 104 does not register key A with the LUNS of target device 116. Instead, because all commands from hosts that would result in errors due to persistent reservations at target device 116 are passed through routing device 104, routing device 104 can be entirely responsible for persistent reservation handling.

According to one embodiment, routing device 104 maintains a registry 129 of reservation keys for the initiators. For example, routing device 104 can maintain registry containing reservation key 128 ("key B") for initiator 108, reservation key 130 ("key C") for initiator 110, reservation key 132 ("key D") for initiator 112 and reservation key 134 ("key E") for initiator 114. Consequently, the initiators that communicate with target device 116 through routing device 104 register with routing device 104 rather than target device 116, even if they believe they are registering with target device 116. Registry 129 can be maintained as a table or other data structure that stores reservation keys and related initiator and/or initiator application information.

The initiator applications can issue Persistent Reserve commands using their respective reservation keys. For example, initiator application 128 can issue a Persistent Reserve Out command with a Reserve action containing key B. When routing device 104 receives the command, routing device 104 can determine if there is a conflict, as discussed below, and, if not, establish the persistent reservation at routing device 104 by, for example, maintaining reservation information 140 to understand the scope and type of reservation made using reservation key B.

If, for example, target device 116 has LUNS 3-5, assume that initiator application 118 issues a Persistent Reserve Out command with a Reserve action having a type of Read Exclusive to LUN 3 of target device 116 using reservation key B. Routing device 104 can maintain reservation information 140 associating the Read Exclusive of LUN 3 with reservation key B. There is no need to forward the reservation to target device 116 as all commands that could lead to a reservation conflict are channeled through routing device 104. Now assume initiator application 120 issues a Persistent Reserve Out command with a Reserve action having a type of Read Exclusive to LUN 4 using reservation key C. Routing device 104 can add additional information to reservation information 140 associating the Read Exclusive of LUN 4 of target device 116 with reservation key C.

Continuing with the previous example in which routing device 104 has received Read Exclusive commands for LUNS 3-4 of target device 116, assume initiator application 122 issues a Persistent Reserve In command requesting the active reservations for LUN 3. Routing device 104 can return to initiator application 122 that there is a Read Exclusive Reservation for LUN 3 under reservation key B. Similarly, if initiator application 128 issues a Persistent Reserve In command requesting registered reservation keys, routing device 104 can return all the keys held by the logical unit.

With respect to conflict handling, routing device 104 can issue Reservation Conflict messages in accordance with the SPC-3 or other earlier standards defining persistent reserve. Whether a conflict exists depends on the type and scope of the persistent reservation requested and the types and scopes of active persistent reservations or reserve commands. Routing device 104 can carryout the processing to determine if such a conflict exists with a new persistent reservation command.

Continuing with the previous example, if initiator application 124 issues a Persistent Reserve Out with an action of Reserve having a type of Write Exclusive and scope of LUN 3 for target device 116, routing device 104 can return a Reservation Conflict because, according to the SPC-3 standard, any Write Exclusive for a LUN for which a LUN has already been reserved with a Read Shared, Write Exclusive, Read Exclusive, Exclusive Access or Shared Access conflicts with the previous reservation of the logical unit. If, on the other hand, initiator application 124 issues a Persistent Reserve Out with an action of Reserve having a type of Write Exclusive to LUN 5, there would not be a conflict as LUN 5 of has not yet been reserved.

Thus, in this embodiment, routing device 104 can perform persistent reservation processing for the logical units within target device 116 without forwarding the reservations to target device 116. This can allow persistent reservations using reservation keys to be implemented for a target device that does not support this feature.

Figure 2:
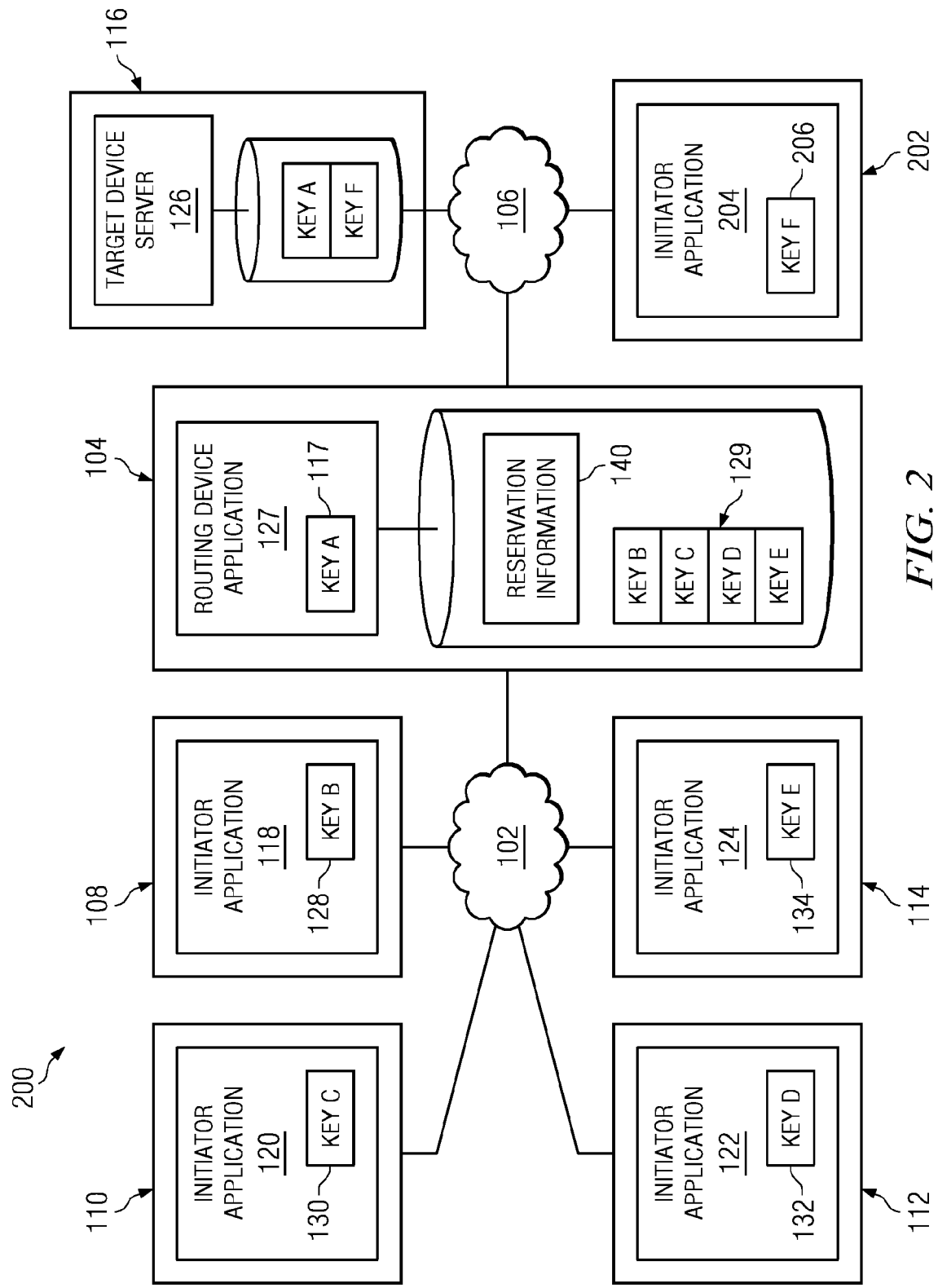
FIG. 2 is a diagrammatic representation of an embodiment of a data communications system according to another embodiment of the present invention.

FIG. 2 is a diagrammatic representation of another embodiment of a communications system 200 in which embodiments of the present invention can be implemented. System 200 can be similar to system 100, except that in embodiment of FIG. 2, at least one additional initiator (e.g., initiator 202 running initiator application 204) can register with and send persistent reserve commands to target device 116. In this case, the persistent reserve commands from initiator 202 do not flow through routing device 104. Initiator 202 can be another routing device that forwards commands to the LUNs of target device 116 using its own reservation key for other initiators or may be another form of initiator.

In the example of FIG. 2, routing device application 127 can use registration key 117 to assert persistent reservations with logical units within target device 116 using reservation key 117 ("key A") and application 204 can assert persistent reservations using reservation key 206 ("key F"). Additionally, as in the case of FIG. 1, routing device 104 maintains a registry 129 of reservation keys for the initiator applications wishing to assert persistent reservations at logical units within target device 116 and that communicate with target these logical units via routing device 104. For example, routing device 104 can maintain reservation key 128 ("key B") for initiator 108, reservation key 130 ("key C") for initiator 110, reservation key 132 ("key D") for initiator 112 and reservation key 134 ("key E") for initiator 114 for each logical unit within target device 116.

In system 200 of FIG. 2, reservations can be made by the initiator applications that communicate with target device 116 via routing device 104 or by initiator application 204. For reservation commands forwarded to target device 116 by routing device 104, the reservations are held under reservation key A while reservations made by initiator application 204 are held under reservation key F. Reservation conflicts can therefore occur either from reservations made by initiator applications 118, 120, 122, 124 that communicate with target device 116 via routing device 104 and/or reservations made by initiator application 204.

According to one embodiment of the present invention, routing device 104 can maintain reservation information 140 for reservations made by initiator applications 118, 120, 122 and 124. Therefore, routing device 104 can perform persistent reservation processing, such as handling conflicts, between reservations made by these initiator applications. Returning to the example in which initiator application 118 issues a Persistent Reserve Out command with a Reserve action having a type of Read Exclusive to of LUN 3 and initiator application 120 issues a Persistent Reserve Out command with a Reserve action having a type of Read Exclusive to LUN 4, these reservations can be forwarded to target device 116 by routing device 104 using reservation key A. Further, for the sake of example, assume initiator application 204 issues a Persistent Reserve Out command with a Reserve action having a type of Read Exclusive to LUN 5 of target device 116. Thus, in this example, LUNS 3-5 of target device 116 are reserved.

If initiator application 204 issues a Persistent Reserve In command requesting registered keys for a logical unit at routing device 116, the associated target device server (e.g., target device server) 126 can return that key A and key F are registered. If initiator application 118 issues the same command, routing device 104 can pass the command to target device 116 and receive back that key A and key F are registered. Because key A corresponds to routing device 104, routing device 104 can, in place of key A, return keys B-E corresponding to initiators 108, 110, 112 and 114 and return key F corresponding to initiator 202.

Similarly, if initiator application 204 issues a Persistent Reserve In command requesting active reservations at LUN 5, the logical unit will return the Read Exclusive reservation of LUN 5 under key F. If initiator application 118 issues the Persistent Reserve In command requesting active reservations of LUN 5, routing device application 127 can forward the command to LUN 5 and receive the same information in return as initiator application 204. If initiator application 204 issues a Persistent Reserve In command requesting active reservations for LUN 3 or 4, the logical unit will return the Read Exclusive reservation under key A. However, routing device application 127, based on reservation information 140 maintained by routing device application 127, can return that the Read Exclusive reservation of LUN 3 is held under key B and the Read Exclusive reservation of LUN 4 is held under key C.

For conflict handling, according to one embodiment of the present invention, routing device application 127 can issue Reservation Conflict messages or other indication of conflict for conflicts between reservations requested by initiators that communicate with target device 116 through routing device 104. Conflict handling with reservations made by other initiators (e.g., initiator 202) is handled by device servers within target device 116. As an example, assume initiator application 124 issues a Persistent Reserve Out command having a Reserve action with a type of Exclusive Write to LUN 3 of target device 116. Based on reservation information 140, routing device application 127 can return a Reservation Conflict message indicating that the requested persistent reservation conflicts with the existing Exclusive Read of LUN 3 held under key B. Now assume that initiator application 124 issues the same command requesting an Exclusive Write of LUN 5. In this case, routing device application 127 may not be aware of the Read Exclusive reservation of LUN 5 held by initiator 202. Routing device application 127 can therefore pass the command to target device 116 using reservation key A. The target device server for LUN 5 can return a Reservation Conflict message based on the Read Exclusive reservation held by initiator 202 under reservation key F. Routing device application 127 can forward the Reservation Conflict message to initiator application 124.

Routing device 104 can thus maintain reservation information for the persistent reserve commands that it has forwarded to logical units within target device 116. The reservation information can associate the active reservations made by the commands with the key used by the initiator to issue the commands. Routing device 104 can return some or all of this reservation information to initiator applications and can perform conflict handling based on the reservation information. Routing device 104 can further forward reservation information and conflict information received from target device 116 to initiator applications that communicate with target device 116 via routing device 104.

In the example of FIG. 2, the logical units of target device 116 support persistent reservations using reservation keys. However, some devices that are accessed by multiple initiators on data transport medium 106 may not support persistent key reservation, but may only support the earlier RESERVE command. The RESERVE command typically reserves the entire logical unit for use by a particular initiator. If logical units at target device 116 do not support persistent key reservation, routing device 104 can, according to one embodiment, simply issue a RESERVE command to a logical unit. For example, if initiator application 118 issues a Persistent Reserve Out command with a Reserve action having a type of Read Exclusive to LUN 3, routing device 104 can issue a RESERVE command. If there is already a reservation at target LUN 3, routing device 104 will receive a Reservation Conflict message that it can forward to initiator application 118. Otherwise, routing device 104 will have exclusive use of LUN 3 at target device 116. Once a logical unit is reserved using the RESERVE command, routing device 104 can perform conflict handling for persistent reservations asserted by initiator applications 118, 120, 122 and 124 based on the reservation information 140 maintained by routing device 104.

Figure 3:
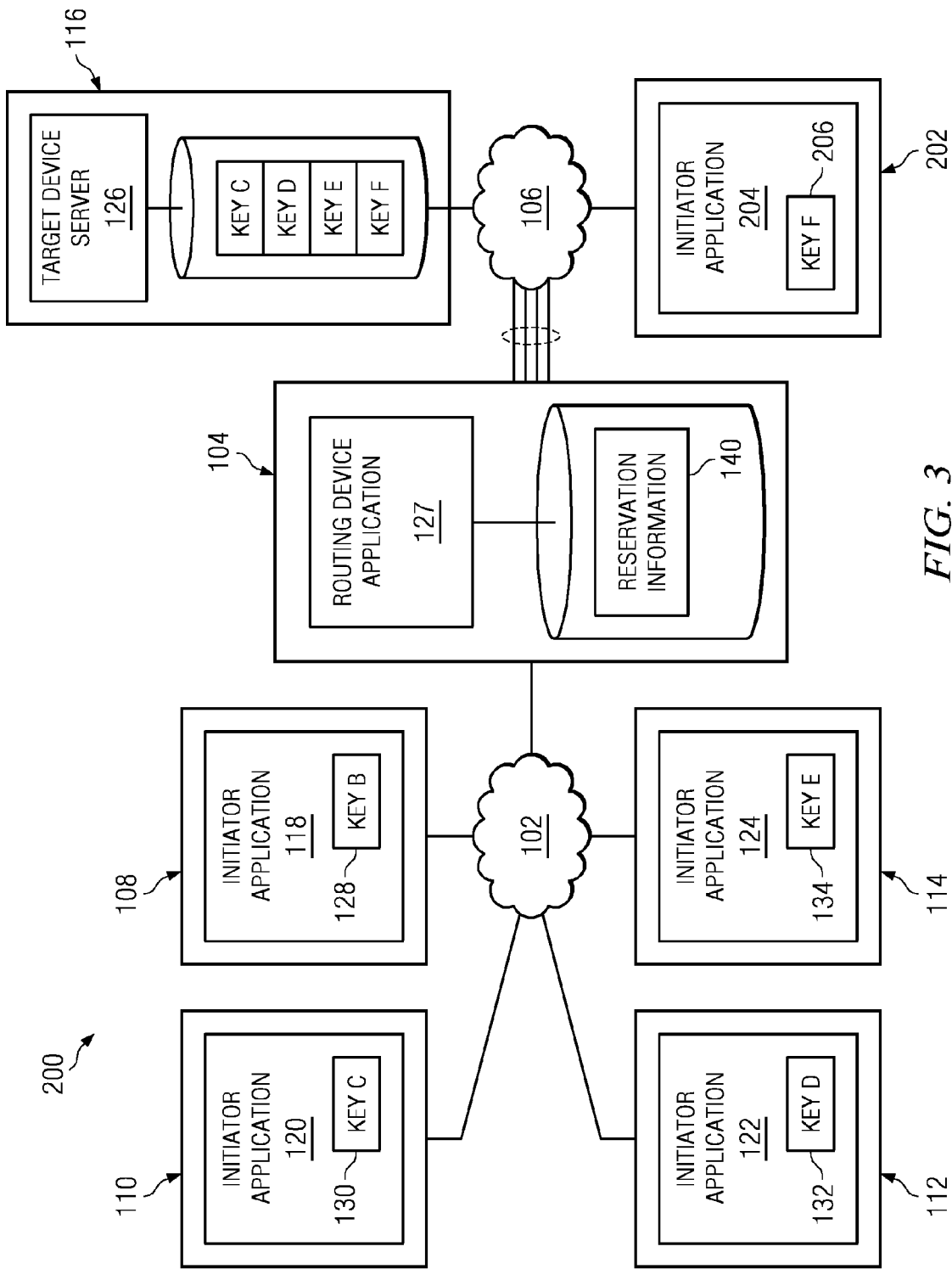
FIG. 3 is a diagrammatic representation of yet another embodiment of a data communications system according to one embodiment of the present invention in which a routing device can present itself as multiple initiators to a target device.

FIG. 3 is a diagrammatic representation of another embodiment of a communications system 300 in which embodiments of the present invention can be implemented. System 300 is similar to system 200 except that routing device 104 can represent itself as multiple initiators to target device 116. This can occur, for example, if second data transport medium 106 is a fibre channel data transport medium to which routing device 104 is connected via multiple ports or if the second data transport medium 106 is a TCP/IP based network to which routing device 104 is connected or in other configurations as would be understood by those of ordinary skill in the art.

Routing device 104 can use multiple persistent keys to assert reservations at target device 116 because routing device 104 appears as multiple initiators on second data transport medium 106. If routing device 104 can present itself as a sufficient number of initiators (e.g., at least four in the case of FIG. 3), routing device 104 can forward persistent reservation keys and commands from initiators 108, 110, 112 and 114 to target device 116. In this case, reservation information 140 can include sufficient information to map initiator identifications between first data transport medium 102 and second data transport medium 106. Generally, the transport specific identifier is used for RESERVE and MOVE actions. The transport specific identifier can be mapped for other commands that rely on the transport specific identifier as these commands are deployed.

Each initiator can use an initiator identifier on first data transport medium 108 that is associated with commands to/from that initiator. For example, Initiator 108 may use an identifier (e.g., WWN, MAC address or other identifier) on data transport medium 102 that identifies it to other devices such as routing device 104. Consequently, commands to/from initiator 108 are associated with this identification. Routing device 104, however, will use another initiator identifier on second data transport medium 106. For each persistent reservation command received from initiator 108, routing device 104 can map the initiator identifier to the same initiator identifier on second data transport medium 106. According to one embodiment, this means that persistent reservation commands from a particular initiator are always seen by target device 116 as coming from the same initiator on second data transport medium 106.

Because persistent reservation keys and persistent reserve commands are passed to target device 116, target device 116 can handle conflict resolution between commands received via routing device 104 or from other devices (e.g., initiator 202). Routing device 104, in this case need simply translate between the data transport protocols used on data transport medium 102 and 106. This can include ensuring that commands received from an initiator on data transport medium 102 are mapped to the appropriate initiator identification for data transport medium 106.

Routing device 104 can register as many persistent reservation keys with target device 116 as the number of initiators that it can present itself as on second data transport medium 106. Thus, for example, if routing device 104 can present itself as four initiators, it can register four persistent reservation keys with target device 116. If, however, there are more initiators that communicate with target device 116 through routing device 104, at least one of the persistent reservation keys registered by routing device 104 can be used in the manner of key A of FIG. 2.

While in FIG. 3, the multiple ports are provided by a single routing device, the multiple ports according to other embodiments can be provided by multiple routing devices acting in a coordinated fashion. According to another embodiment, multiple routing devices can be connected between first data transport medium 102 and second data transport medium 106. The multiple routers can coordinate activities (e.g., via a control network, such as an Ethernet network) to act as multiple initiators on second data transport medium 106. If there are a sufficient number of routers acting in a coordinated manner (e.g., four in the case of FIG. 3), the reservation keys for initiators 108, 110, 112 and 114 can be passed to target device 116 without having to use reservation keys for the routing devices. In other words, multiple coordinated routing devices can work in a similar manner as a multiple port routing device except that routing is coordinated across routing devices rather than ports of a single routing device. In this case, all persistent reservation commands from a particular initiator on data transport medium 102 will be forwarded to target device 116 by the same one of the multiple routing devices.

Figure 4:
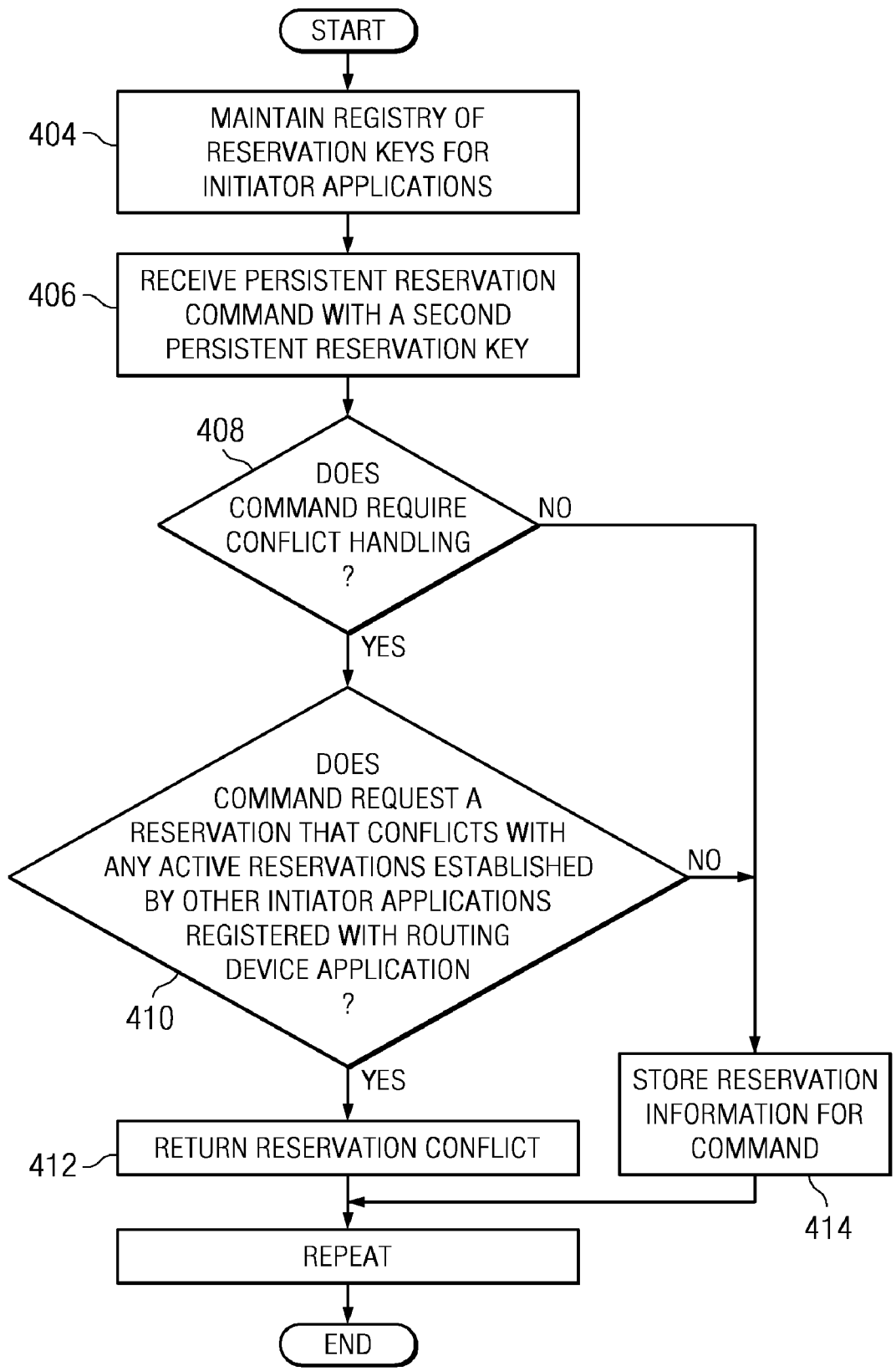
FIG. 4 is a flow chart illustrating one embodiment of a method for persistent reservation key handling.

FIG. 4 is a flow chart illustrating one embodiment of a method for persistent reservation key handling in which the routing device is the only initiator that accesses the target device (i.e., on behalf of initiators that communicate with the target device through the router). The methodology of FIG. 4 can be implemented, for example, through the execution of a set of computer instructions stored on a computer readable medium (e.g., a routing device application 127 at routing device 104). At step 404, routing device application 127, can establish and maintain a registry of reservation keys associated with initiators that access a target device through routing device 104. The registry can include at least one key for each initiator that wishes to make persistent reservations at target device 116 through routing device 104. Routing device 104 can, according to one embodiment, generate and distribute the keys to the attached initiators.

At step 406, routing device 104 can receive a persistent reservation command using a key associated with one of the initiators. If the command requires conflict handling, as determined at step 408, control can pass to step 410. At step 410, routing device application 127 can determine if the command requests a reservation that would conflict with any active reservations established by another initiator registered with routing device application 127 (i.e., any initiator for which there is a registration key in the registry). If so, routing device application 127 can return a Reservation Conflict to the initiator application issuing the command. Otherwise, control can pass to step 412.

At step 414, routing device 104 can store reservation information associating any active reservation created by the persistent reservation command with the reservation key used by the initiator. Routing device 104 can also return reservation information to an initiator application to inform the initiator application of the status of reservations, registered reservation keys and other information. According to one embodiment, reservations and keys are not passed through to the target device, but are maintained entirely by routing device 104. The methodology of FIG. 4 can be repeated as needed or desired.

Figure 5:
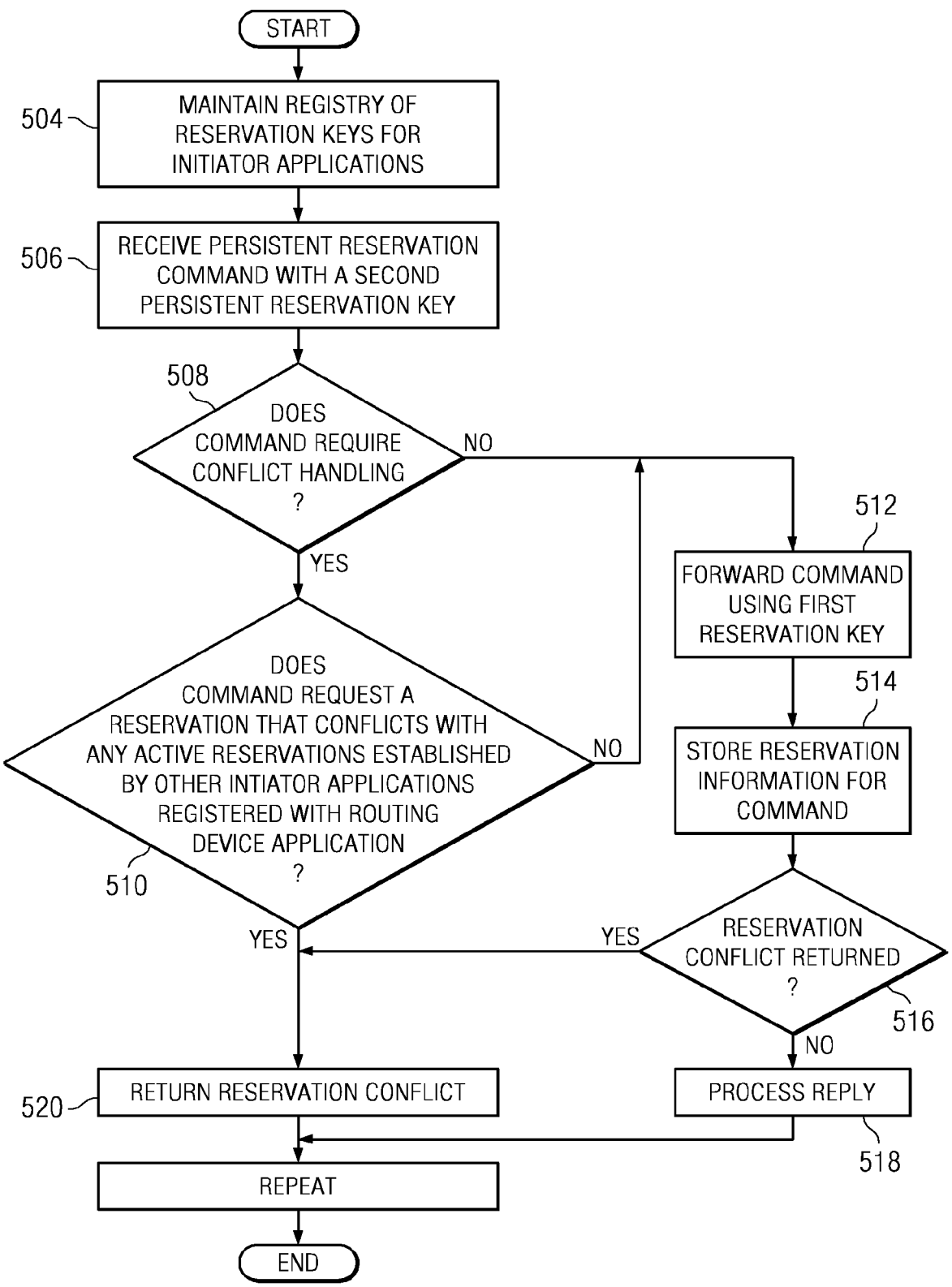
FIG. 5 is a flow chart illustrating another embodiment of a method for persistent reservation key handling.

FIG. 5 is a flow chart illustrating one embodiment of a method for persistent reservation key handling in which the target device supports persistent reserve and can be accessed by the routing device and other initiators. The methodology of FIG. 5 can be implemented, for example, through the execution of a set of computer instructions stored on a computer readable medium (e.g., a routing device application 127 at routing device 104). At step 502, routing device application 127 can optionally register with a target device (e.g., target device 116) using a first reservation key (e.g., key A). Routing device application 127, at step 504, can establish and maintain a registry of reservation keys associated with initiators that access the target device through routing device 104. The registry can include at least one key for each initiator that wishes to make persistent reservations at target device 116 through routing device 104.

At step 506, routing device 104 can receive a persistent reservation command using a key associated with one of the initiators. If the command requires conflict handling, as determined at step 508, control can pass to step 510. At step 510, routing device application 127 can determine if the command requests a reservation that would conflict with any active reservations established by other initiators registered with routing device application 127 (i.e., any initiator for which there is a registration key in the registry). If so, routing device application 127 can return a Reservation Conflict to the initiator application issuing the command (step 520). Otherwise, control can pass to step 512.

At step 512, routing device 104 can forward the persistent reservation command to the target device using the routing device's key (e.g., key A) and, at step 514, store reservation information associating any active reservation created at the target device by the persistent reservation command with the reservation key used by the initiator that initially issued the persistent reservation command. If a Reservation Conflict message is returned by the target device, as determined at step 516, the Reservation Conflict message can be passed to the initiator that issued the command (step 520). Otherwise, at step 518, routing device 104 can process the response from the target device. For example, if reservation information is returned by the target device (e.g., in response to a Reserve In Command requesting registered keys or active reservations), routing device 104 can modify the reservation information. Modification of the reservation information may include changing the reservation keys associated with active reservations in the registration information. For example, if the registration key A is associated with an Exclusive Read of LUN 3 of the target device in the reservation information returned by the target device, routing device 104 can modify the reservation key A to reservation key B to indicate that the reservation is held by another initiator. Thus, a portion of the reservation information returned to the initiator application can be supplied by routing device 104, while another portion can be supplied by the target device.

The methodology of FIG. 5 can be repeated as needed or desired. It should be noted that the steps of FIG. 5 can be performed in different orders. For example, routing device 104 can perform processing related to conflict handling after a response, (e.g., a Reservation Conflict message) is received from target device 116.

Figure 6:
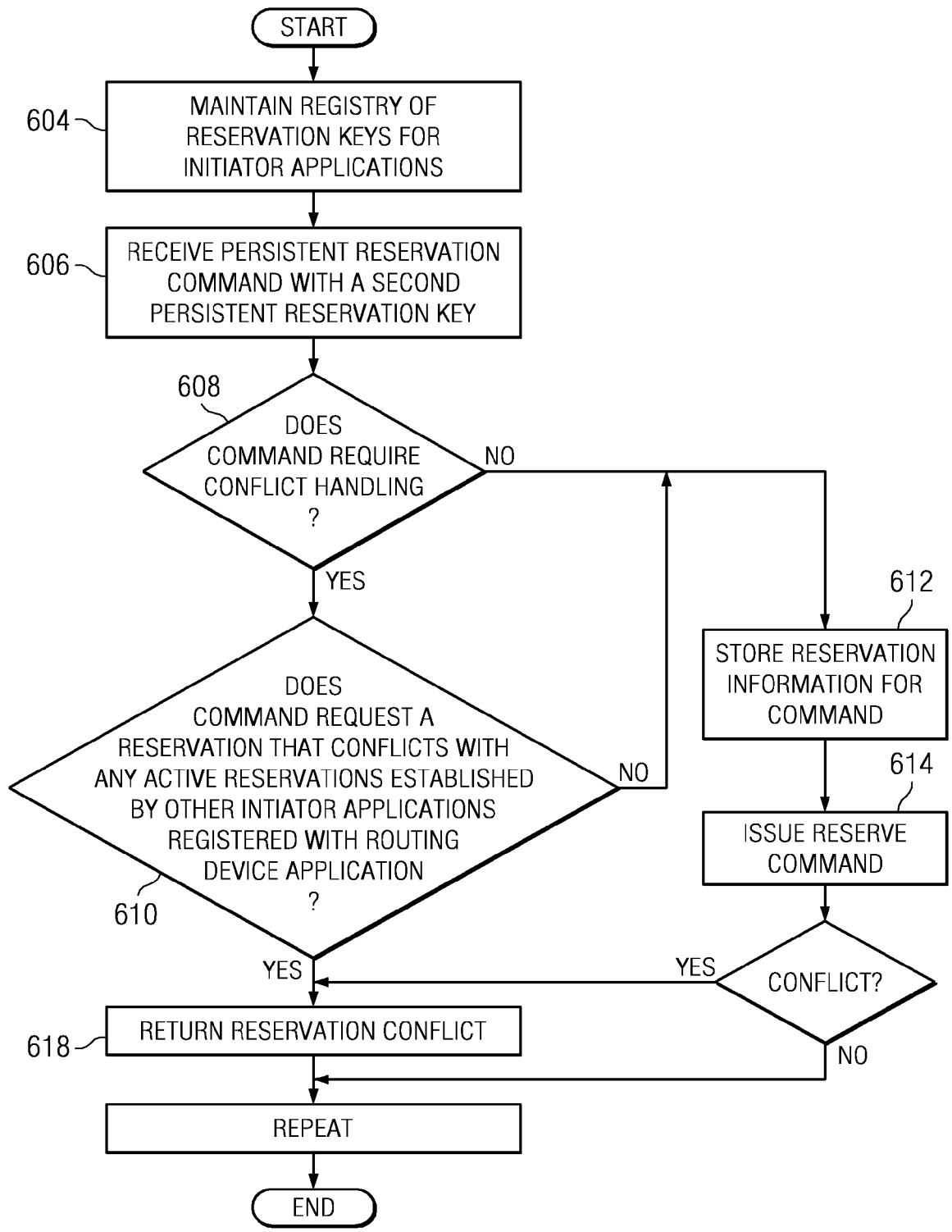
FIG. 6 is a flow chart illustrating another embodiment of a method for persistent reservation key handling.

FIG. 6 is a flow chart illustrating yet another embodiment of persistent reservation handling in which the routing device uses a RESERVE command to assert a reservation at the target device. FIG. 6 is a flow chart illustrating one embodiment of a method for persistent reservation key handling. The methodology of FIG. 6 can be implemented, for example, through the execution of a set of computer instructions stored on a computer readable medium (e.g., a routing device application 127 at routing device 104). At step 604, routing device application 127, can establish and maintain a registry of reservation keys associated with initiators that access a target device through routing device 104. The registry can include at least one key for each initiator that wishes to make persistent reservations at target device 116 through routing device 104.

At step 606, routing device 104 can receive a persistent reservation command using a key associated with one of the initiators. If the command requires conflict handling, as determined at step 608, control can pass to step 610. At step 610, routing device application 127 can determine if the command requests a reservation that would conflict with any active reservations established by another initiator registered with routing device application 127 (i.e., any initiator for which there is a registration key in the registry). If so, routing device application 127 can return a Reservation Conflict to the initiator application issuing the command. Otherwise, control can pass to step 612.

At step 612, routing device 104 can store reservation information associating any active reservation created at the target device by the persistent reservation command with the reservation key used by the initiator application. At step 614, routing device can issue a RESERVE command to reserve target device 116. If a Reservation Conflict message is returned, routing device 104 can return the Reservation Conflict message to the appropriate initiator application (step 618). Routing device 104 can also return reservation information to an initiator application to inform the initiator application of the status of reservations, registered reservation keys and other information. The methodology of FIG. 6 can be repeated as needed or desired.

Figure 7:
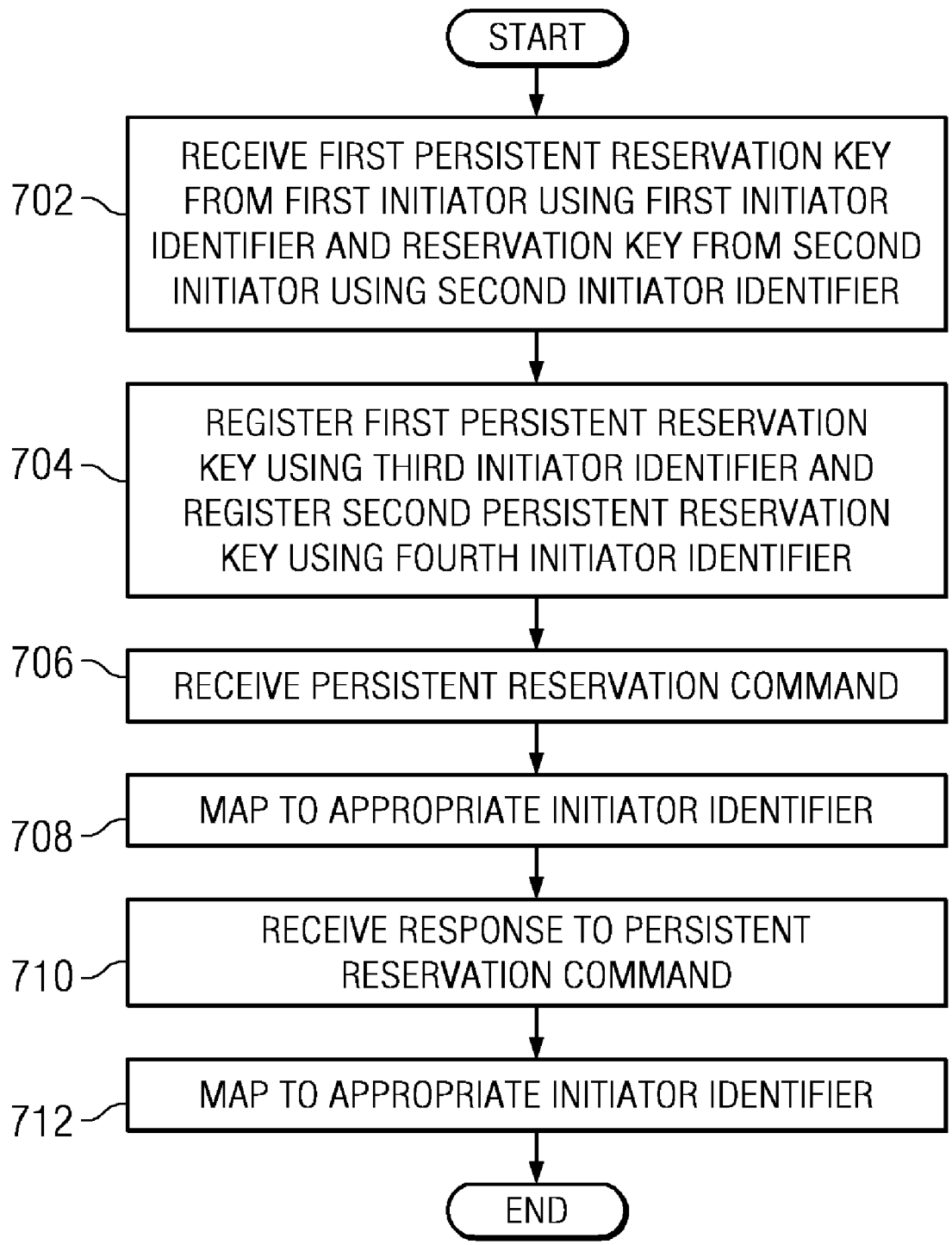
FIG. 7 is a flow chart illustrating yet another embodiment of a method for persistent reservation key handling.

FIG. 7 is a flow chart illustrating yet another embodiment for handling persistent reservations in a multi-initiator environment. At step 702 a routing device (e.g., routing device 104) can receive a persistent reservation key from a first initiator and a second initiator. Each initiator can have a particular initiator identification associated with that initiator (e.g., device name, network address, LUN, MAC address or other initiator identification). For the sake of example, these are referred to as the first and second initiator identifier. At step 704, the routing device can register the persistent reservation key received from the first initiator application with a target device using an initiator identifier associated with the routing device and can register the persistent reservation key received from the second initiator application with the target device using another initiator identifier associated with the routing device. The initiator identifiers used by the routing device are referred to, for the sake of example, as the third and fourth initiator identifiers.

At step 706, the routing device can receive a persistent reservation command from an initiator application and, at step 708, can map the initiator identifier associated with the command to the initiator identifier used by the routing device to register the reservation key for that initiator application. For example, if the persistent reservation command is received from the first initiator application, the routing device can map the first initiator identifier (i.e., the identifier used by the first initiator application) to the third initiator identifier (i.e., the initiator identifier used by the routing device to register the reservation key for the first initiator application). If, on the other hand, the persistent reservation command is received from the second initiator, the routing device can map the second initiator identifier (i.e., the identifier used by the second initiator application) to the fourth initiator identifier (i.e., the initiator identifier used by the routing device to register the reservation key for the second initiator). At step 710, the routing device can receive a response to the persistent reservation command and, at step 712, map the initiator identifier associated with the response to the appropriate initiator identifier for the first or second initiators. The methodology of FIG. 7 can be implemented as a set of computer instructions stored on a computer readable medium. The steps of FIG. 7 can be repeated as needed or desired.

Figure 8A:
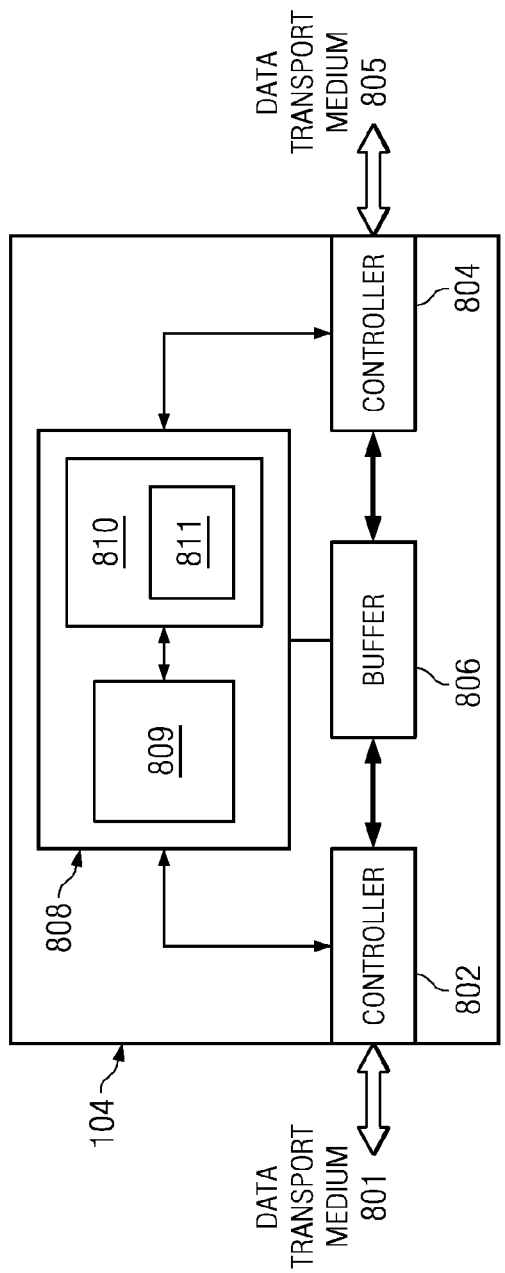
FIGS. 8A and 8B are diagrammatic representations of one embodiment of a routing device.

FIG. 8A is a diagrammatic representation of one embodiment of a routing device 104 in which command processing according to embodiments of the present invention can be implemented. The routing device can comprise a first transport medium controller 802 that interfaces with a first transport medium and a second transport medium controller that interfaces with a second transport medium 804. In one embodiment of the present invention, the first transport medium can be a Fibre Channel transport medium, the second transport medium a SCSI bus, controller 802 a Fibre Channel controller, such as a fibre channel controller based on the TACHYON family of fibre channel control chips and controller 804 a SCSI controller. TACHYON fibre channel control chips are a product Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5400x, where x is the Rev A, B, C, etc.), the DX4 (HPFC-5700x, where x is the Rev A, B, C, etc.).

In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; SATA and Fibre Channel; Fibre Channel and Serial SCSI Architecture; Serial SCSI Architecture and Fibre Channel; Infiniband and Serial Attached SCSI; Serial Attached SCSI and Infiniband. Each transport medium, regardless of the data transport protocol by which it operates, can carry SPC commands.

A buffer 806 provides memory work space and is connected to both controller 802 and to controller 804. A processing unit 808 is connected to controller 802, controller 804 and buffer 806. According to one embodiment of the present invention, processing unit 808 comprises one or more processors 809 for controlling operation of the storage router, handling address mapping and security access and converting commands between protocols and a computer readable medium 810 accessible by the processor storing a set of computer instructions 811 (e.g., a routing device application) that are executable by the processor. According to other embodiments of the present invention buffer 806 and/or computer readable medium 811 can be onboard processor 810.

In one implementation (not shown), the storage router can be a rack mount or free standing device with an internal power supply. The routing device can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of the storage router can support SCSI direct and sequential access target devices and can support SCSI initiators, as well. The Fibre Channel port can interface to SCSI-3 FCP enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the routing device can include software as required to control functions of the various elements, track commands, generate commands and provide appropriate translations between the FC and SCSI data transport protocols.

Figure 8B:
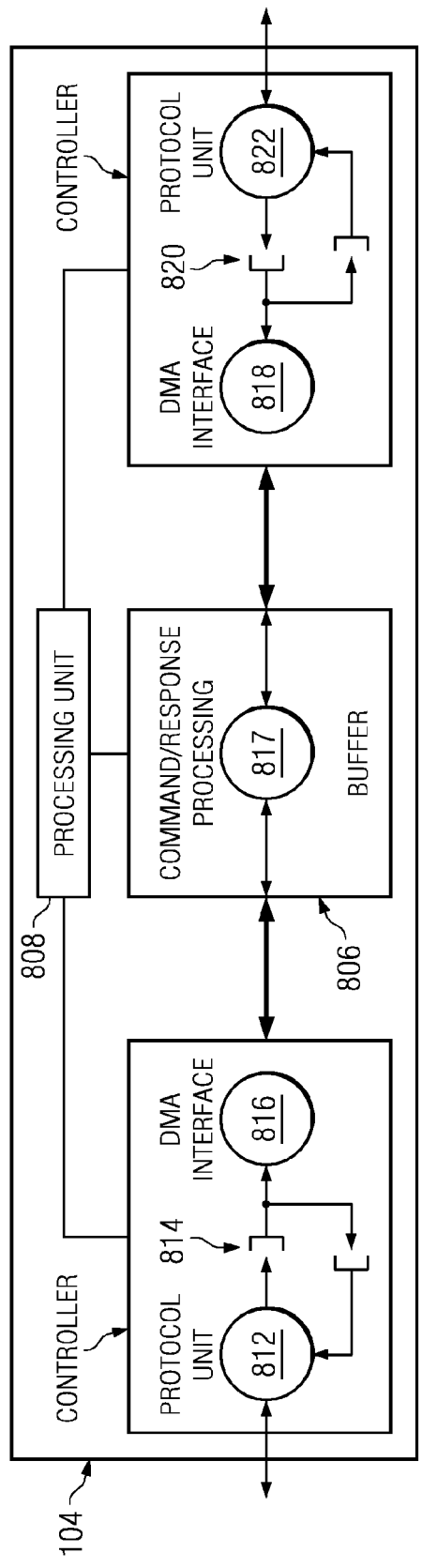

FIG. 8B is a block diagram of one embodiment of data flow within the storage router of FIG. 8A. As shown, data from the first transport medium (e.g., the Fibre Channel transport medium) is processed by a protocol unit 812 (e.g., a Fibre Channel protocol unit) and placed in a FIFO queue 814. A direct memory access (DMA) interface 816 then takes data out of FIFO queue 814 and places it in buffer 806.

Processing unit 808 processes the data in buffer 806 as represented by processing 817. This processing can include mapping between the first data transport protocol and the second data transport protocol, persistent reservation processing and applying access controls and routing functions. A DMA interface 818 then pulls data from buffer 806 and places it into a buffer 820. A second protocol unit 822 pulls data from buffer 820 and communicates the data on the second transport medium (e.g., the SCSI bus). Data flow in the reverse direction, from the second data transport medium to the first data transport medium, can be accomplished in a reverse manner. Processing unit 808 can be operable to execute a routing device application that can register with a target device, maintain a registry of reservation keys for initiator applications, forward persistent reservation commands to a target device using a registration key for the routing device and perform other persistent key reservation processing as described above.

It should be noted that while the routing device application, in the above example, is discussed as a single program, it can be code that is distributed among the various programs utilized by the routing device. The routing device application can be a module of a larger program, a distributed application or implemented according to any suitable programming architecture as would be understood by those in the art.

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A method for handling persistent reservations in a multi-initiator environment in which commands generated by initiators in a first domain are transmitted to one or more target devices in a second domain, the method comprising:

maintaining a registry of keys at a routing device for multiple initiators that access the one or more target devices through the routing device, wherein the routing device resides between the first domain and the second domain, wherein the first domain and the second domain are different SCSI domains, wherein the routing device represents a single initiator of the commands to the one or more target devices;

at the routing device, receiving from a first initiator a persistent reservation command with a first persistent reservation key associated with the first initiator in the first domain;

at the routing device, rejecting the persistent reservation command if it conflicts with reservations held by other initiators and returning a conflict message to the first initiator in the first domain; and if no conflicts are found then forwarding the persistent reservation command to a target device in the second domain using the routing device's key.

2. The method of claim 1, further comprising:

maintaining a registry of persistent reservation keys for the multiple initiators, wherein the registry includes the first persistent reservation key.

3. The method of claim 2, further comprising:

requesting a set of reservation information from the target device indicating an active reservation associated with the routing device's key;

modifying the set of reservation information to associate the active reservation with a third persistent reservation key, wherein the third persistent reservation key is associated with another initiator; and returning the set of reservation information to the first initiator indicating the active reservation is held under the third persistent reservation key.

4. The method of claim 2, wherein the conflict message is a RESERVATION CONFLICT message.

5. The method of claim 1, further comprising maintaining a set of reservation information associating active reservations at logical units within the target device with the persistent reservation keys in the registry.

6. A computer program product comprising a set of computer instructions stored on a computer readable medium, wherein the set of computer instructions comprise instructions executable to:

maintain a registry of keys at a routing device for multiple initiators in a first domain that access one or more target devices in a second domain through the routing device, wherein the routing device resides between the first domain and the second domain, wherein the first domain and the second domain are different SCSI domains, wherein the routing device represents a single initiator of the commands to the one or more target devices;

at the routing device, receive a persistent reservation command using a first persistent reservation key associated with an initiator in the first domain;

at the routing device, reject the persistent reservation command if it conflicts with reservations held by other initiators and return a conflict message to the initiator in the first domain; and if the persistent reservation command does not conflict, forward the persistent reservation command to a target device in the second domain using the routing device's key.

7. The computer program product of claim 6, wherein the registry of keys includes the first persistent reservation key and a third persistent reservation key.

8. The computer program product of claim 7, wherein the set of computer instructions further comprise instructions executable to:

modify a set of reservation information indicating an active reservation associated with the routing device's key to associate the active reservation with the third persistent reservation key; and return the set of reservation information to the initiator indicating the active reservation is held under the third persistent reservation key.

9. The computer program product of claim 7, wherein the set of computer instructions further comprise instructions executable to:

determine that a reservation requested by the persistent reservation command conflicts with an active reservation at the target device; and return a reservation conflict message to the initiator.

10. The computer program product of claim 9, wherein the set of computer instructions further comprise instructions executable to maintain a set of reservation information associating active reservations at logical units within the target device with the persistent reservation keys in the registry of keys.

11. The computer program product of claim 7, wherein the step of returning a reservation conflict message to the initiator further comprises indicating that the active reservation is held under the third persistent reservation.

12. A method for handling persistent key reservations at a routing device in a multi-initiator environment comprising:

at a routing device residing between multiple initiators and one or more target devices:

maintaining a registry associating a set of initiator persistent reservation keys with the multiple initiators;

receiving via a first data transport medium a persistent reservation command from a first initiator using a first initiator persistent reservation key associated with the first initiator, wherein the first initiator persistent reservation key is in the set of initiator persistent reservation keys;

determining if the persistent reservation command requests a reservation that conflicts with an active reservation requested by another of the multiple initiators; and if the persistent reservation command does not conflict, forwarding the persistent reservation command via a second data transport medium to a target device using a persistent reservation key associated with the routing device, wherein the persistent reservation key associated with the routing device is distinct from the set of initiator persistent reservation keys, and wherein the first data transport medium and the second data transport medium represent different SCSI domains.

13. The method of claim 12, further comprising returning a reservation conflict message if the persistent reservation command requests a reservation that conflicts with an active reservation previously requested by another of the multiple initiators.

14. The method of claim 12, further comprising:

receiving a reservation conflict message from the target device indicating that the persistent reservation command requested a reservation that conflicts with an active reservation previously requested under a second initiator persistent reservation key not in the registry; and forwarding the reservation conflict message to the first initiator.

15. The method of claim 12, further comprising:

receiving a set of reservation information from the target device indicating an active reservation held under the persistent reservation key associated with the routing device;

modifying the set of reservation information to associate the active reservation with a second initiator persistent reservation key that is in the registry; and returning the set of reservation information to the first initiator indicating the active reservation is held under the second initiator persistent reservation key.

16. The method of claim 12, further comprising maintaining a set of reservation information at the routing device associating a reservation requested by the persistent reservation command with the first initiator persistent reservation key.

17. The method of claim 12, wherein the persistent reservation command is a persistent reservation command according to the SPC-3 SCSI standard.

18. A method for handling persistent reservations in a multi-initiator environment comprising:

maintaining a registry of persistent reservation keys for a plurality of initiators at a routing device, wherein the routing device resides between different SCSI domains having the plurality of initiators and one or more target devices;

at the routing device, maintaining a set of reservation information associating active reservations with the persistent reservation keys in the registry;

at the routing device, receiving a persistent reservation command associated with a first persistent reservation key from a first initiator, wherein the first persistent reservation key is in the registry at the routing device;

at the routing device, determining if a reservation requested by the persistent reservation command conflicts with a reservation requested by another initiator from the plurality of initiators; and depending upon whether a conflict exists, returning a reservation conflict to the first initiator or forwarding the persistent reservation command to the target device using a routing device persistent reservation key.

19. The method of claim 18, further comprising:
registering the routing device persistent reservation key with the target device.

20. The method of claim 19, further comprising:
associating the reservation conflict with a second persistent reservation key, wherein the second persistent reservation key is contained in the registry.

21. The method of claim 18, further comprising issuing a RESERVE command to the target device to reserve the target device.

22. A method for handling persistent reservations in a multi-initiator environment comprising:

at a routing device residing between different SCSI domains having multiple initiators and one or more target devices, receiving a first persistent reservation command with a first persistent reservation key from a first initiator using a first initiator identification;

at the routing device, receiving a second persistent reservation command with a second persistent reservation key from a second initiator application using a second initiator identification;

forwarding the first persistent reservation command and first persistent reservation key from the routing device to a target device using a third initiator identification; and forwarding the second persistent reservation command and second persistent reservation key from the routing device to the target device using a fourth initiator identification.

23. The method of claim 22, wherein the first and second persistent reservation keys are received over a first data transport medium and are forwarded to the target device over a second data transport medium.

24. The method of claim 23, further comprising presenting a routing device as multiple initiators on the second data transport medium.

25. The method of claim 24, further comprising:
mapping the first initiator identification to the third initiator identification for persistent reservation commands received from the first initiator application; and mapping the second initiator identification to the fourth initiator identification for persistent reservation commands from the second initiator application.

26. The method of claim 25, further comprising:
mapping the third initiator identification to the first initiator identification for responses from the target device to the persistent reservation commands from the first initiator application; and mapping the fourth initiator identification to the second initiator identification for response from the target device to the persistent reservation commands from the second initiator application.

\* \* \* \* \*